US011630991B2

(12) United States Patent
Mills et al.

(10) Patent No.: US 11,630,991 B2
(45) Date of Patent: Apr. 18, 2023

(54) BROADCASTING MODE OF PLANAR ENGINE FOR NEURAL PROCESSOR

(71) Applicant: Apple Inc., Cupertino, CA (US)

(72) Inventors: Christopher L. Mills, Saratoga, CA (US); Kenneth W. Waters, San Jose, CA (US); Youchang Kim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 637 days.

(21) Appl. No.: 16/781,824

(22) Filed: Feb. 4, 2020

(65) Prior Publication Data

US 2021/0241079 A1    Aug. 5, 2021

(51) Int. Cl.
| | | |
|---|---|---|
| *G06N 3/063* | (2023.01) | |
| *G06N 3/084* | (2023.01) | |
| *G06F 7/78* | (2006.01) | |
| *G06F 9/54* | (2006.01) | |
| *G06N 20/10* | (2019.01) | |

(52) U.S. Cl.
CPC .............. *G06N 3/063* (2013.01); *G06F 7/78* (2013.01); *G06F 9/542* (2013.01); *G06N 3/084* (2013.01); *G06N 20/10* (2019.01)

(58) Field of Classification Search
CPC ..................................................... G06N 3/063
See application file for complete search history.

(56) References Cited

U.S. PATENT DOCUMENTS

| | | | |
|---|---|---|---|
| 6,745,173 B1 | 6/2004 | Amundsen et al. | |
| 10,409,887 B1 | 9/2019 | Gauria et al. | |
| 10,853,448 B1* | 12/2020 | Shalev | G06F 17/12 |
| 10,885,433 B2* | 1/2021 | Song | G06N 3/04 |
| 2018/0300628 A1 | 10/2018 | Young et al. | |
| 2020/0110986 A1* | 4/2020 | Michiels | G06F 17/153 |
| 2020/0142949 A1* | 5/2020 | Liao | G06F 7/523 |
| 2020/0293770 A1* | 9/2020 | Chen | G06V 30/19173 |

FOREIGN PATENT DOCUMENTS

WO    WO 2018/080617 A1    5/2018

* cited by examiner

*Primary Examiner* — Michael J Metzger
(74) *Attorney, Agent, or Firm* — Fenwick & West LLP

(57) ABSTRACT

Embodiments relate to a neural processor that includes one or more neural engine circuits and planar engine circuits. The neural engine circuits can perform convolution operations of input data with one or more kernels to generate outputs. The planar engine circuit is coupled to the plurality of neural engine circuits. A planar engine circuit can be configured to multiple modes. In an elementwise mode, the planar engine circuit may combine two tensors by performing operations element by element. The planar engine circuit may support elementwise operation for two tensors that are in different sizes and ranks. The planar engine circuit may perform a broadcasting operation to duplicate one or more values across one or more channels to make a smaller tensor matching the size of the larger tensor.

20 Claims, 8 Drawing Sheets

BROADCASTING MODE OF PLANAR ENGINE FOR NEURAL PROCESSOR

BACKGROUND

1. Field of the Disclosure

The present disclosure relates to a circuit for performing operations related to neural networks, and more specifically to a neural processor that includes a plurality of neural engine circuits and one or more multi-mode planar engine circuits that can reshape a tensor.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning techniques that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configurations is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to a neural processor that includes a plurality of neural engine circuits and a planar engine circuit coupled to the plurality of neural engine circuits. At least one of the neural engine circuits performs a convolution operation of first input data with one or more kernels to generate a first output. The planar engine circuit receives second input data that corresponds to the first output or corresponds to a version of the first input data of the neural processor. The input data of the neural processor may be data received from a source external to the neural processor, or outputs of the neural engine circuits or planar engine circuit in a previous cycle. The planar engine circuit performs a broadcasting operation on a version of the second input data to generate a processed input data by at least duplicating a value of the second input data across a dimension. The planar engine circuit performs an elementwise operation on the processed input data to generate a second output.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural processor that includes one or more planar engine circuits which are efficient at performing various operations. The planar engine circuit supports reshaping of input data to enable two input data that are of different ranks and sizes to be aggregated or compared element by element. In a broadcasting operation, the planar engine circuit duplicates the values of the smaller input data across one or more dimensions to match the size of the larger input data. This enables an efficient processing of data by storing the data in a more compact format and expanding the data by the broadcasting operation before the computation.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

Figure 1:
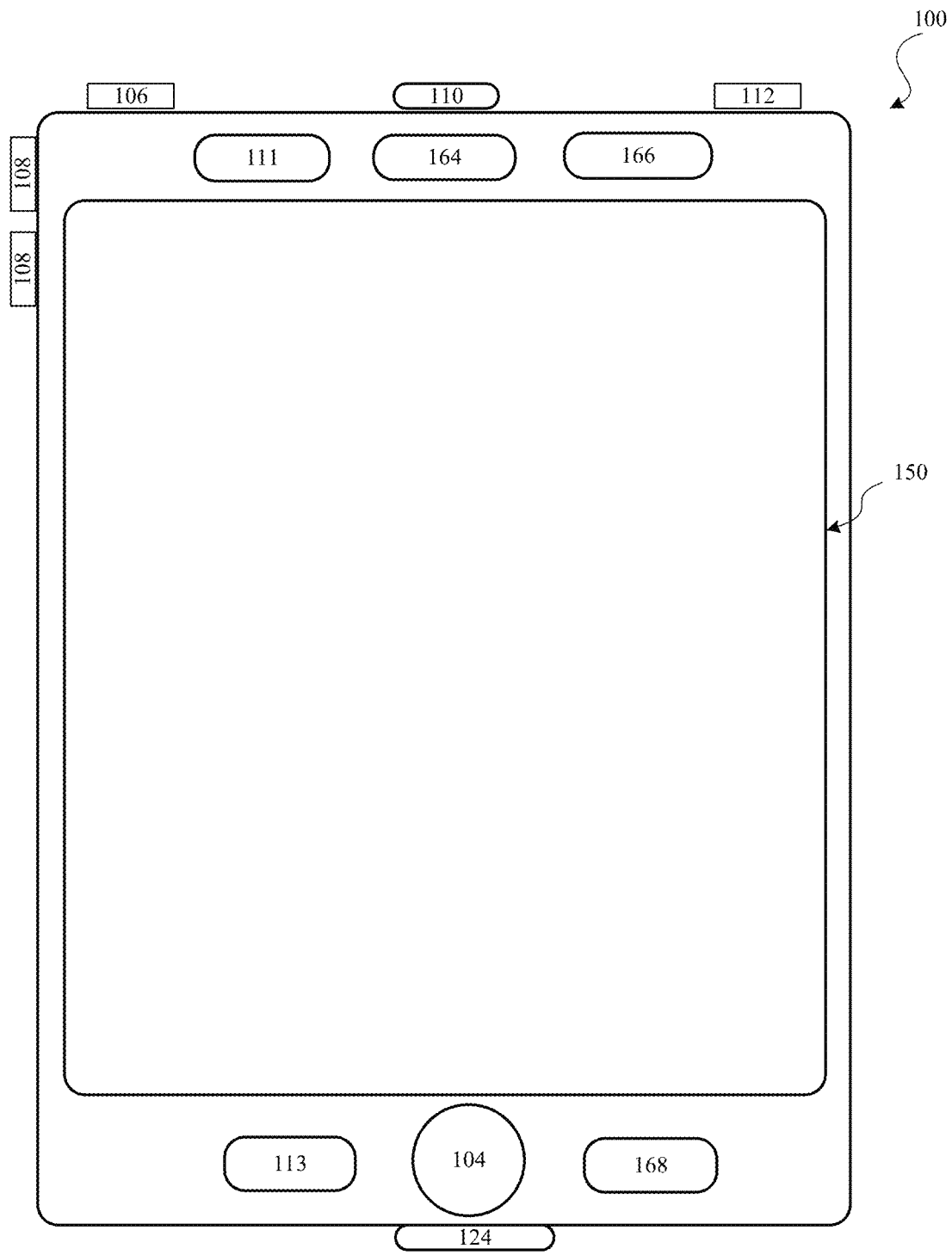
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
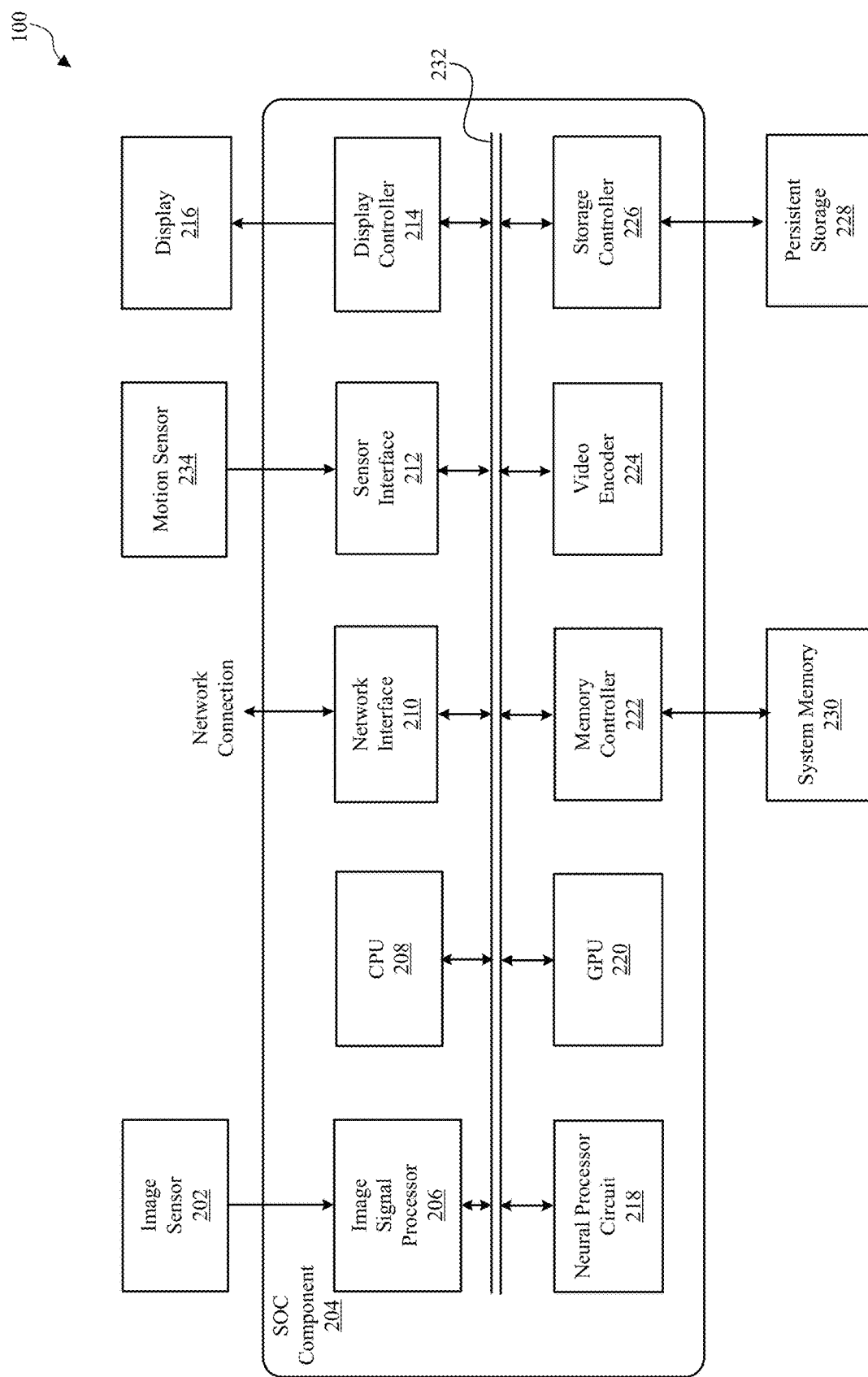
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional neural networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
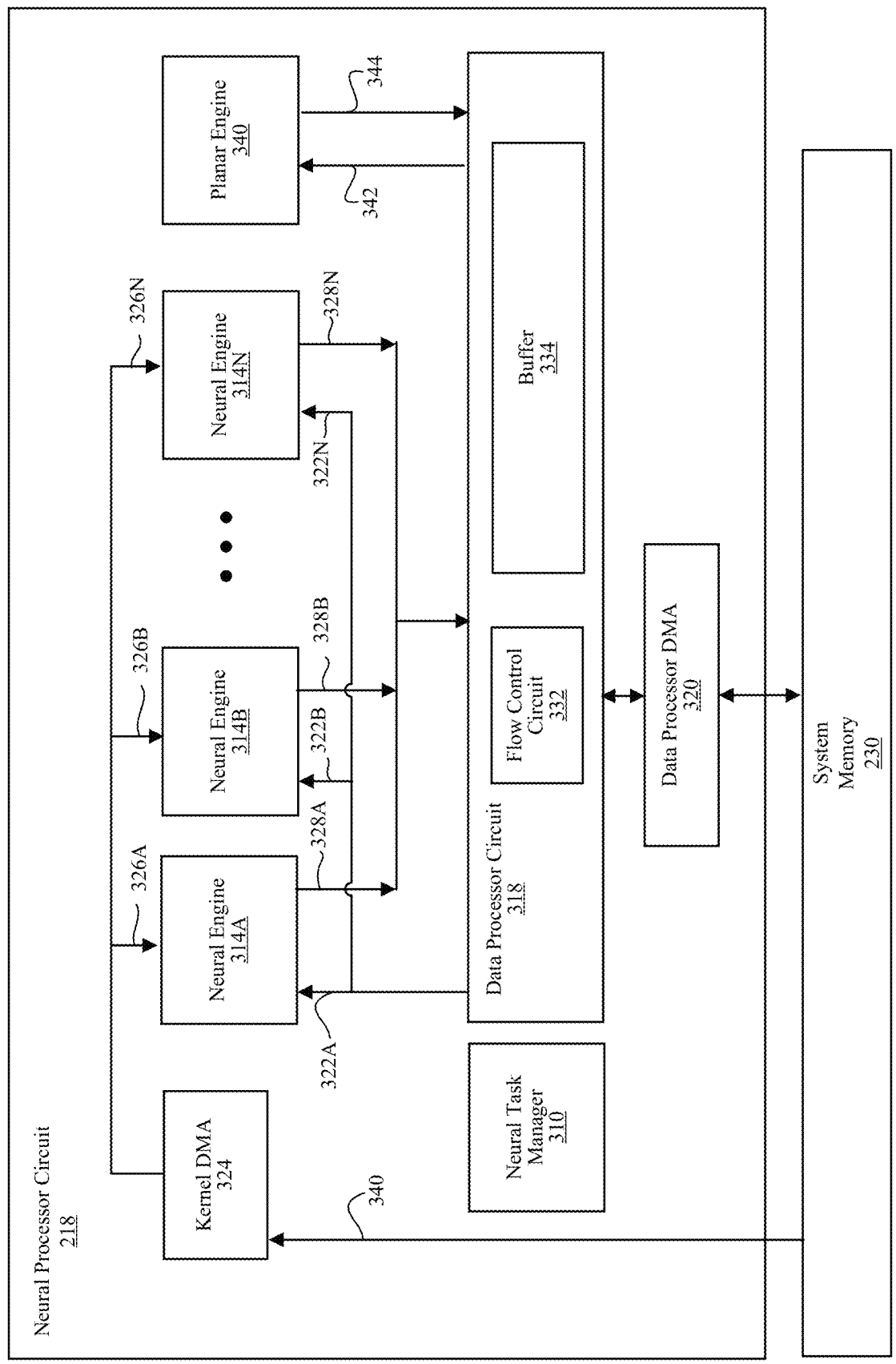
FIG. 3 is a block diagram illustrating an example neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, and planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer 334. Buffer 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as the input 342 to planar engine 340. Likewise, the output 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer 334, and a write circuit that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without involvement of CPU 208.

Example Neural Engine Architecture

Figure 4:
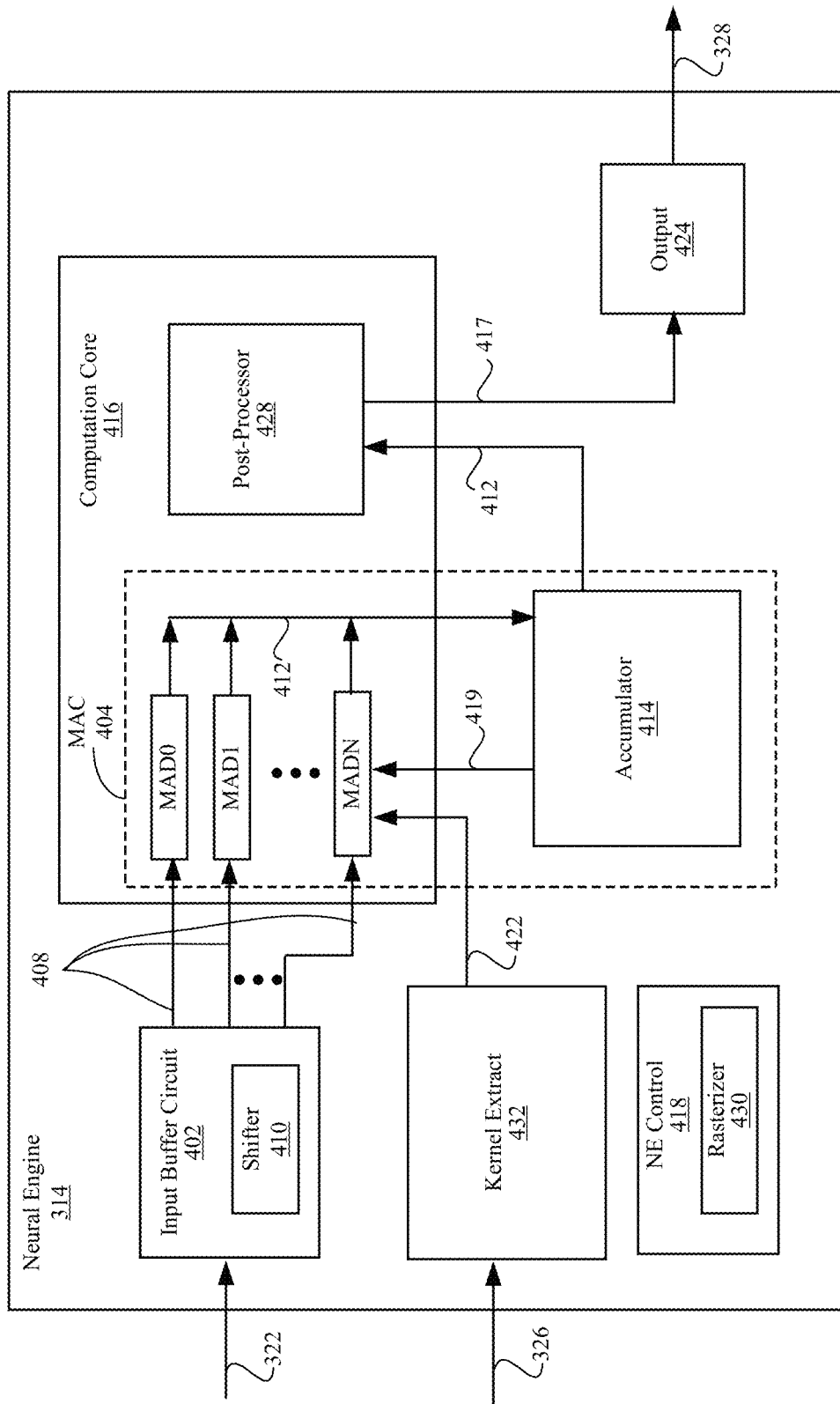
FIG. 4 is a block diagram of an example neural engine in the neural processor circuit, according to one embodiment.

FIG. 4 is a block diagram of neural engine 314, according to one embodiment. Neural engine 314 performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to the MAC circuit while data stored in a second subunit of accumulator 414 is sent to post-processor 428.

Post-processor 428 is a circuit that performs further processing of values 412 received from accumulator 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer 334. Other components of neural processor circuit 218 (e.g., kernel DMA 324, buffer DMA 320, data buffer 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine

Figure 5:
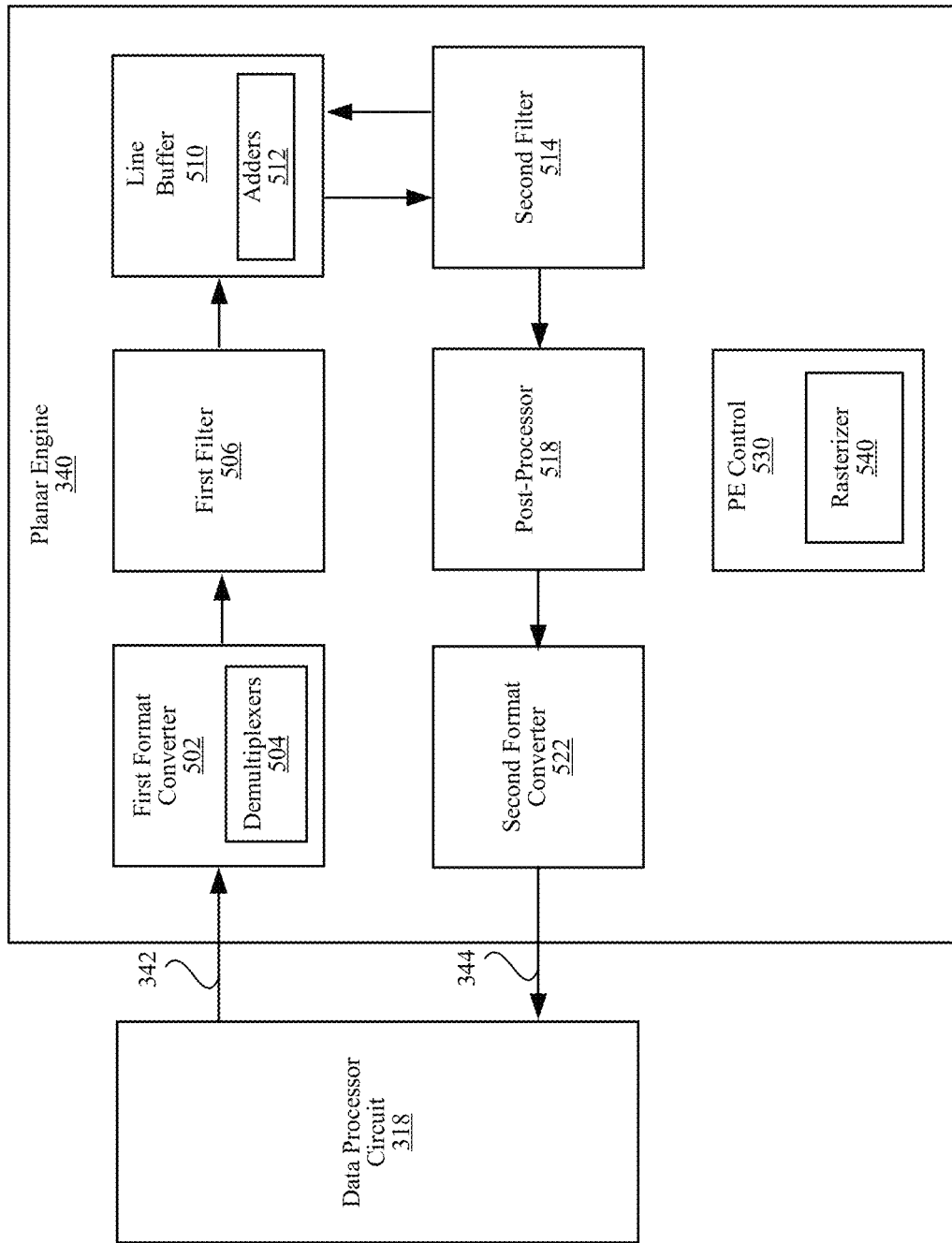
FIG. 5 is a block diagram of an example planar engine in the neural processor circuit, according to one embodiment.

FIG. 5 is a block diagram of planar engine 340, according to one embodiment. Planar engine 340 is a circuit that is separated from the plurality of neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), and quantizing numbers. Format conversions may also include changing the size of a tensor such as by broadcasting a value of a tensor in one or more dimensions to expand the rank of the tensor. For example, first format converter 502 may also include one or more demultiplexers 504 that are used to duplicate values across one or more dimensions of the input data in the broadcasting operation. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, second filter 514 performs elementwise operations while first filter 506 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed at by first filter 506 may be stored in line buffer 510 and then be read by second filter 514 for further filtering. In the reduction mode, however, data is processed by second filter 514, reduced at first filter 506 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Figure 6A:
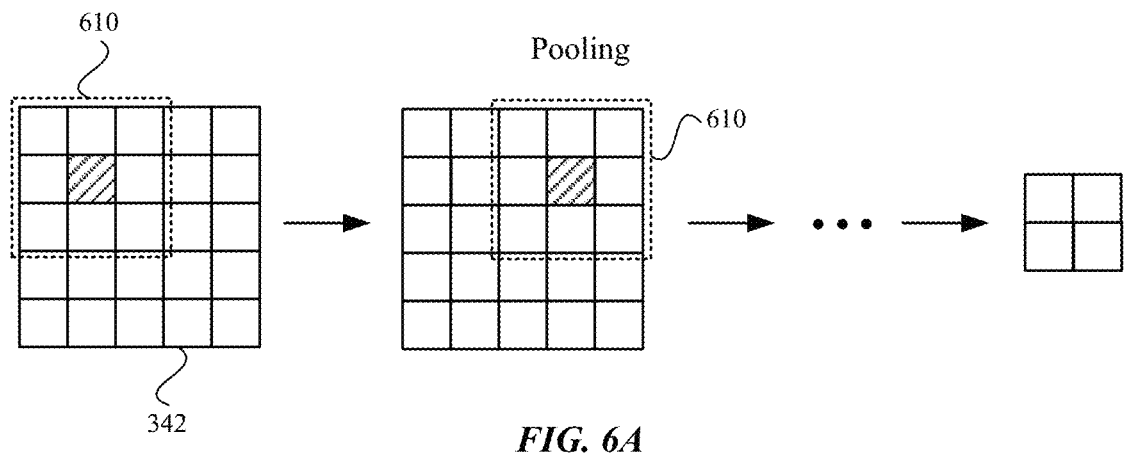
FIGS. 6A, 6B, and 6C are conceptual diagrams respectively illustrating a pooling operation, an elementwise operation, and a reduction operation, according to one embodiment.
Figure 6B:
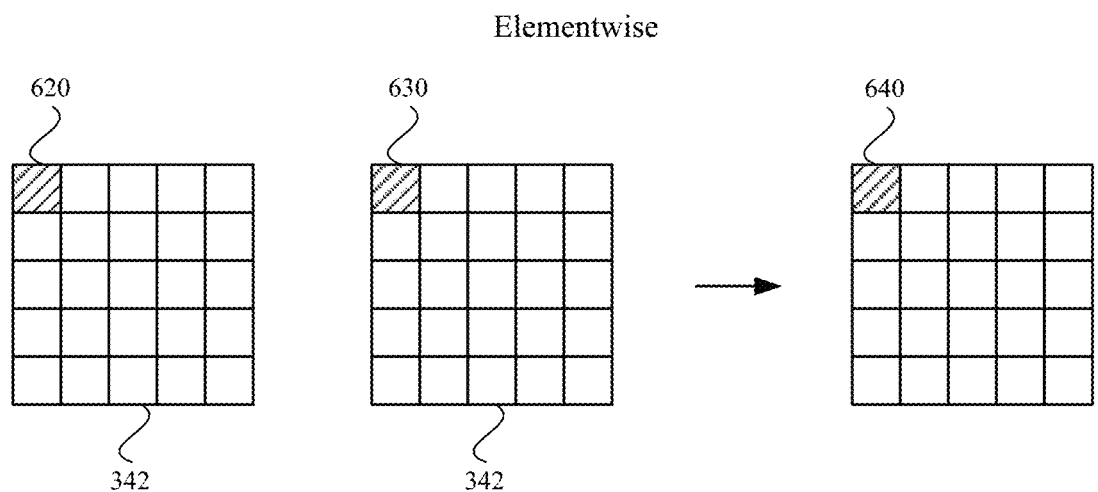
Figure 6C:
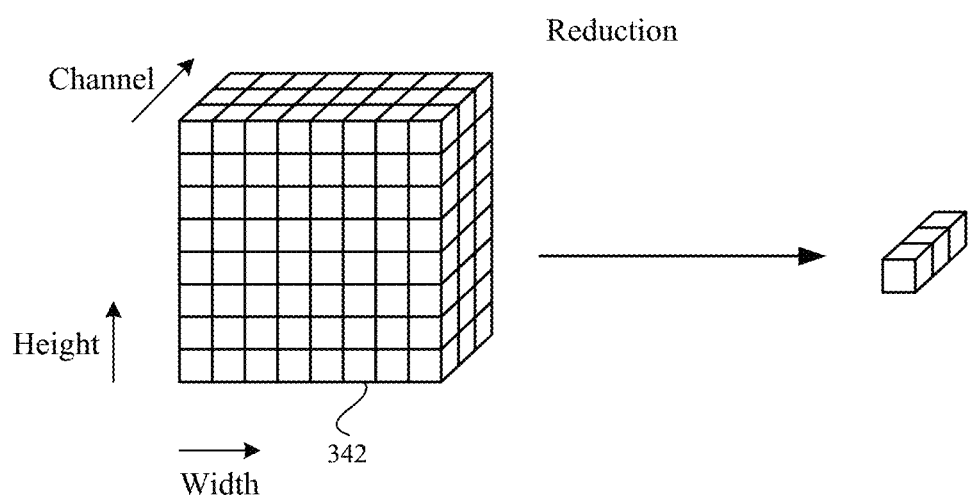

FIGS. 6A, 6B, and 6C are the conceptual diagrams illustrating operations for different example modes of planar engine 340, according to an embodiment. The 5×5 input data 342 of two dimensions (e.g., a rank 2 tensor) is shown only for illustration purpose. The input data 342 can be of any suitable size and ranks. Input data 342 may be the data saved in buffer 334 of the data processor circuit 318. For example, in some cases, the data saved in buffer 334 fetched as input data 342 is an output of neural engine 314. In other cases, the data saved in buffer 334 fetched as input data 342 may be the output of planar engine 340 in previous cycles. In yet other cases, the data saved in buffer 334 fetched as may be a segment of data received from system memory 230.

Example Pooling Mode

In a pooling operation shown in FIG. 6A, planar engine 340 reduces the spatial size of input data 342 to generate an output. The pooling operation may depend on the filter size, a stride factor, and the type of filtering operation. The filter size determines the size of the filter applied in a pooling operation. FIG. 6A illustrates a filter 610 that is 3×3 in size although filters of other sizes such as 5×5, 7×7, and 9×9 may be used. FIG. 6A also illustrates a stride factor of 2, which results in the center of filter 610 skipping one pixel in both horizontal and vertical directions. Based on a 3×3 filter with a stride factor of 2, the spatial size of the 5×5 input data will be reduced to a 2×2 output data because center of filter 610 will cover only four pixels in the 5×5 input data.

The types of filtering performed by planar engine 340 in the pooling mode may include averaging, choosing a maximum value, and choosing a minimum value. In averaging, the values of the pixels covered by the filter will be averaged. First filter circuit 506 and second filter circuit 514 include adders and multiplier to perform the averaging operation. In one embodiment, the pixel values (or a horizontal or vertical subset) covered by the filter may be added first by the adders and then applied with a reducing factor using a multiplier to achieve the averaging. The reducing factor may correspond to the size of the filter. For example, for a 3×3 filter, the reducing factor of each dimension may be 1/3.

In operations for choosing a maximum or minimum value, the adders and multiplier in first filter circuit 506 and second filter circuit 514 may be bypassed. Instead, comparators in first filter circuit 506 and second filter circuit 514 are used to select the maximum or minimum value in the values of input data covered by the filter.

To reduce the number of repeated computations, the filtering operation on a version of the input data may be performed separately by first filter 506 and second filter 514. Using FIG. 6A as an example, first filter of 1×3 size may be applied horizontally first to reduce a first dimension and generate intermediate data. For example, the intermediate data may be 5×2 in size after the horizontal filter is applied. The intermediate data is then stored in the line buffer 510 for sending to the vertical filter 514. Next, second filter 514 applies a vertical filter that is 3×1 in size to further reduce the second dimension of the intermediate data. Second filter 514 may include one or more multipliers for applying a weight factor to the computed value when performing averaging. While the terms "horizontal" and "vertical" are used, the first and second dimensions may respectively represent any of two different dimensions in a dataset such as a tensor.

In the pooling mode, post-processor 518 may be bypassed. Second format converter 522 may perform one or more format conversions as described above with reference to FIG. 5.

Example Elementwise Mode

In an elementwise mode as shown in FIG. 6B, one or both of first filter 506 and second filter 514 may be used to perform one or more elementwise operations while line buffer 510 and post-processor 518 may be bypassed. In the elementwise mode, planar engine 340 performs an elementwise operation of the input data.

If input data 342 in the elementwise mode is received from a single source dataset, the operation is referred to as a unary operation. For example, planar engine 340 may fetch only a segment of a single tensor from data processor circuit 318. In an example unary operation, each value in input data 342 may be squared to generate an output. If input data 342 is received from two source datasets (e.g., from two datasets stored in data processor circuit 318), the operation to combine the two source datasets is referred to as a binary operation. If two tensors are added, the addition operation is a binary operation because input data 342 includes values from both source datasets that represent the two tensors. In one embodiment, planar engine 340 may support up to a ternary operation in one operation cycle.

In the elementwise mode, first format converter 502 may perform various tasks including, but not limited to, transposing one or more input tensors (e.g., width-to-channel transpose), broadcasting values of the input tensors to expand the sizes and ranks of the input tensors, and performing other format conversions on input data 342. Transposing input tensor can be advantageous, among other reasons, because it allows per-channel gains or biases to be stored in a vector format. This may be more efficient in terms of hardware footprint, bandwidth and operation performance for the elementwise operations. Broadcasting values can be performed to expand the sizes of input data 342 in one or more dimensions by duplicating values of a tensor in one or more dimensions. For example, first format converter 502 may duplicate the data values of a column vector (a vector having a size equal to 1 in one dimension) to expand the size to another size. When input data 342 includes two tensors from two sources, values of one or both of the tensors may be broadcasted so that the size and ranks of the two tensors are matched for downstream elementwise operations. The first format converter 502 may include one or more demultiplexers 504 to perform the broadcasting operations. Details of the broadcasting operations will be discussed with reference to FIG. 7.

One or both of first filter 506 and second filter 514 may be reconfigured to perform an elementwise operation. In a binary operation that includes two sources, the data values of the two sources may first be interleaved (e.g., $A_1$, $B_1$, $A_2$, $B_2$, etc., where $A_1$ and $B_1$ are data values from the two sources, respectively). As illustrated in FIG. 6B, value 620 of the first source is combined with the corresponding value 630 of the second source to generate value 640. First and second filters 506 and 514 perform such operation on an element-by-element basis.

Planar engine 340 may support different types of elementwise operations including, but not limited to addition, subtraction, elementwise maximum (e.g., comparing values 620 and 630), elementwise minimum, elementwise multiplication, and elementwise sum followed by squaring. The adders of filters 506 and 514 may set to operate in parallel to each other where the data values from two sources are interleaved and passed through the adders to generate the elementwise result. If the elementwise operation is elementwise multiplication, elementwise maximum, or elementwise minimum, the multipliers or the digital comparators in the filters 506 and 514 may be set to conduct the elementwise operation for the interleaved data values. In a binary elementwise mode, two tensors are combined to generate an output tensor as a version of output 344.

The function and operations of second format converter 522 in the elementwise mode is the substantially same as those in the pooling mode except that a transpose may be applied to output 344 at second format converter 522. The transpose at second format converter 522 may or may not be related to the transpose operation at first format converter 502. For example, in one case, a reversed transpose may be applied to output 344 at second format converter 522 for a transposed tensor, but in another case a transpose that is unrelated to how the tensor was transposed at first format converter 502 may be applied at second format converter 522. Likewise, a transpose may be applied to output 344 at second format converter 522 even though a transpose was not applied at first format converter 502.

Example Ternary Mode

A ternary mode is a specific type of elementwise operation that performs elementwise operations on three source tensors in an operating cycle. The ternary mode may be used to perform elementwise per channel gain-and-bias operation in an operating cycle. In the ternary mode, three source datasets are fetched from the data processor circuit 318. A tensor to be gained and biased is the first source dataset. The scaling factors for the gains are the second source dataset. The bias values are the third source dataset. In fetching the source datasets, the planar engine 340 fetches the first source dataset as the first tensor as a part of input data 342. Planar engine 340 fetches both the second source dataset and the third source dataset together as the second tensor as another part of input data 342. For example, the values of the second source and the values of the third source may be arranged in a dimension (e.g., an unused dimension) of the second tensor. Whether a value is from the second source or the third source may be identified form the index position of the value in the dimension.

In the ternary mode, first format converter 502 may perform various format conversion tasks discussed above with reference to the elementwise mode. In the ternary mode, first filter 506 and second filter 514 may also perform elementwise operations in a manner similar to the process described above with reference to the elementwise mode, with the difference that each filter may perform elementwise operations for different sets of values. For example, first filter 506 may perform an elementwise operation between the first tensor stored in input data 342 and the set of bias values stored as a first part of the second tensor in the input data 342. Second filter 514 may perform elementwise operations between the first tensor stored in input data 342 and the set of scaling factors stored as a second part of the second tensor in input data 342.

Example Reduction Mode

In a reduction mode as illustrated in FIG. 6C, planar engine 340 may perform a reduction operation that reduces the rank of a tensor. After processing, planar engine 340 provides an output that represents the reduced tensor. For example, in one case, a rank 5 tensor may be reduced to a rank 2 tensor. In another case, a rank 3 tensor may be reduced to a rank 1 tensor (e.g., a vector). Planar engine 340 may support different types of reduction, including averaging, a global maximum (e.g., the highest value in the tensor) and a global minimum.

In the reduction mode, planar engine 340 aggregates the values in the dimensions that need to be reduced to generate an aggregated value, which can be a scalar value, while maintains the size of the dimension that does not need to be reduced. In this context, a scalar value may cover both a scalar (e.g., a rank 0 tensor) and also a tensor that has a size 1 in all dimensions. For convenience of reference, the dimensions to be reduced may be referred to as width and height while the dimension not to be reduced may be referred to as channel. However, the names of the dimensions are for example only. In various reduction operations, the dimensions to be reduced can be different and also the number of dimensions to be reduced may also be different (e.g., in one case 1 dimension is reduced while the sizes of two dimensions are maintained). Also, in some cases all dimensions of a tensor may be reduced.

In the reduction mode, the tensor to be reduced may be larger than a work unit, which corresponds to the capacity of planar engine 340 in an operating cycle. Planar engine 340 performs reduction operations in multiple operating cycles and store intermediate values corresponding to different channel positions in line buffer 510. In the reduction mode, planar engine 340 may be programmed to have the sequence of second filter 514, first filter 506, line buffer 510, and post-processor 518. For an operating cycle, second filter 514 may perform elementwise operations to adjust at least a subset of values in a work unit that is fetched as input 342. The subset of values may correspond to the values in width and height in a work unit. For each operating cycle, first filter 506 operates as a reduction tree that reduces the values in the subset to an aggregated value. Planar engine 340 may include register (e.g., being located as a part of first filter 506) to accumulate the aggregated values of different work units that correspond to the same channel to generate a single aggregated value. Line buffer 510 includes memory locations to separately store the aggregated values of different channels because the channel dimension is not reduced. For example, in FIG. 6C, because there are three channels, three separate aggregated values are stored in line buffer 510.

In one embodiment, the operations and functions of first format converter 502 in the reduction mode is similar to what described above with reference to the pooling mode except that first format converter 502 in the reduction mode may fetch data from a second source dataset. The data from the second source may be used in the elementwise mode at first filter 506 such as for the use in subtraction.

To perform certain types of reduction such as determining variance or standard deviation, one of the first filter 506 or second filter 514 may operate in the same manner as in the elementwise mode. In one embodiment, one of the two filters 506 and 514 may include additional multiplier circuits for performing averaging in pooling mode. The filter with the additional multiplier circuits may be used for elementwise operation. For example, in one embodiment, second filter 514 may be used to perform the elementwise operation.

If the reduction involves subtraction (e.g., in determining variance or standard deviation), a binary elementwise operation corresponding to the subtraction may be performed by second filter 514. For other types of reduction, no elementwise operation is performed on the values of the input data, and second filter 514 may be bypassed.

First filter 506 functions as a reduction tree to aggregate values in a version of the input data 342 to reduce the values to a single value. In one embodiment, using first filter 506 instead of second filter 514 as the reduction tree may reduce the number of paths needs to be connected to line buffer 510 because line buffer 510 is also programmed to receive values from first filter 506 in the pooling mode. However, in another embodiment, the roles of first filter 506 and second filter 514 in the reduction mode may be interchanged. The reduction tree may include a plurality of layers of computation units that gradually aggregate the values in input data 342 or values derived from input data 342. Different computation units in first filter 506 may be used depending on the type of reduction operation. For example, if the reduction operation is to determine the average, variance, or standard deviation of values in a tensor, adders may be the computation units used. If the reduction operation is to determine the maximum or minimum value, comparators may be the computation units used. The input layer of the reduction tree may include the most number of computation units and the number of computation units in each subsequent layer is progressively reduced. For example, if each work unit includes 64 data values, the input layer may include 32 computation units, a second layer may include half of the computation units (e.g., 16 units), a third layer may have a further reduced number of computation units (e.g., 8 units), etc. The reduction tree continues to aggregate the values until a single computation unit at the output layer to compute a single value.

In the reduction mode, line buffer 510 is downstream of first filter 506 and second filter 514. For this purpose, line buffer 510 may include adders 512. In some cases, the tensor to be reduced may include multiple source datasets that are stored in buffer 334. For example, the tensor may be large enough so that the tensor is segmented into multiple source datasets in buffer 334. The source datasets may also be referred to be as "patches." Each patch includes multiple channels and the subsets of data in a single channel of the patch includes multiple work units. Since values across different channels are not further reduced, line buffer 510, using adders 512, accumulates per-channel aggregated values in different memory locations of line buffer 510. For example, if the tensor has N channels, N memory locations are used to store the reduced values for the N channels. The values of a channel may be stored across different patches, line buffer 510 accumulates the values in different patches in its memory locations. The reduced tensor may be a vector that maintains the size of the channel. For example, in FIG. 6C, each plane that includes width and height is reduced to a single value but values across different channels are separately treated.

In the reduction, post-processor 518 may perform certain mathematical computations that may be inefficient to perform using a general computation circuit. Such operation may involve determining the square root of the values. For this purpose, post-processor 518 may include a circuit that computes a square root of floating-point numbers. Post-processor 518 may also include a circuit that performs inversion on a number in a format of higher precision than the format of output 344. In another example, post-processor 518 may include a multiplier that scales the accumulated values to generate an average value. Post-processor 518 may include other circuits for performing various operations associated with reduction operations.

The operations and functions of second format converter 522 in the reduction mode are similar to what described above with reference to the pooling mode, except that the aggregated value may be repeated along one or more dimensions and the generated reduced tensor may be reshaped. For example, a reduced tensor may be reshaped to another tensor that has a different size or rank. The output 344 may be a scalar value, a reduced tensor, or a reshaped reduced tensor.

Example Broadcasting Operation

Figure 7:
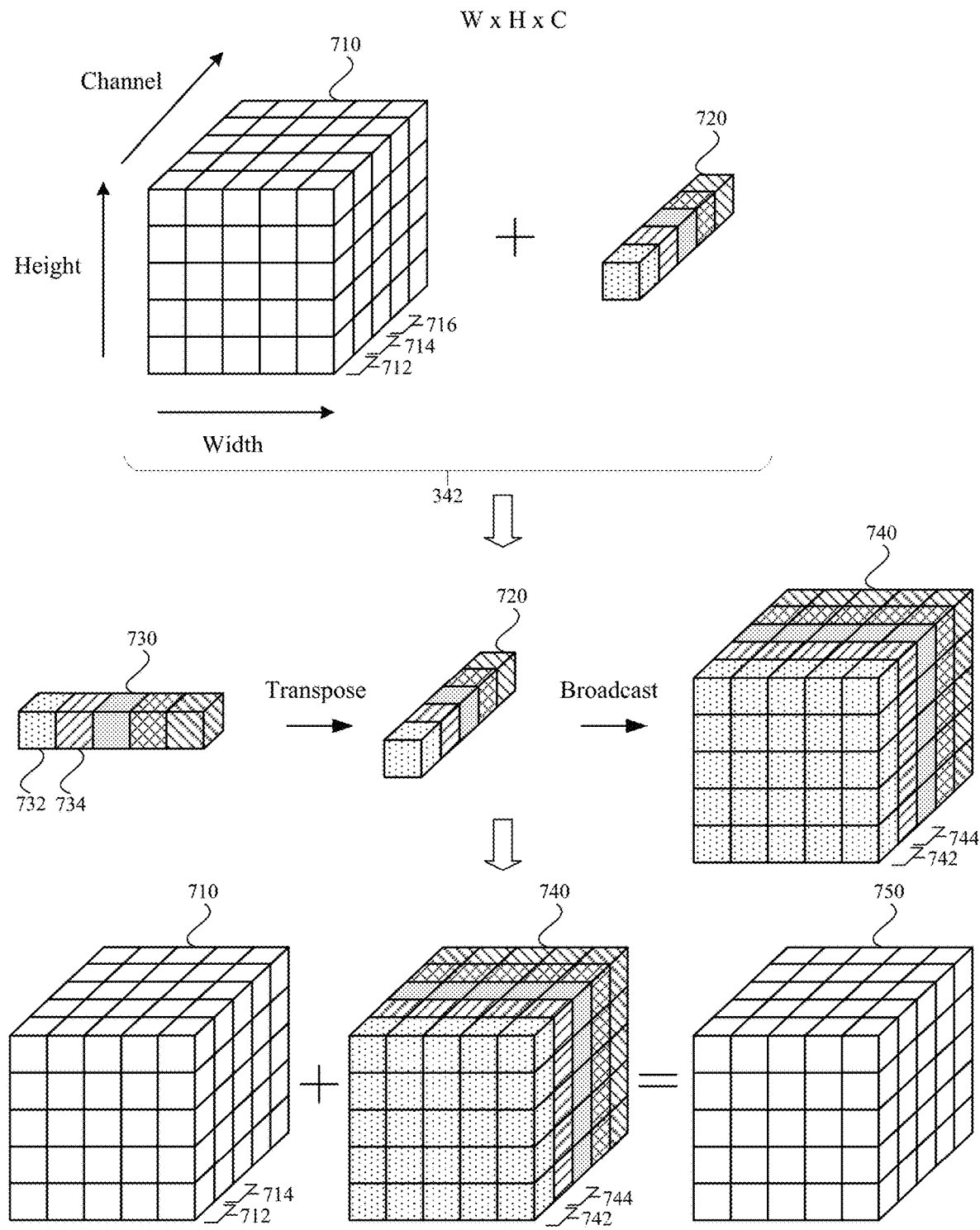
FIG. 7 is a conceptual diagram illustrating a transpose and a broadcasting operation, according to one embodiment.

FIG. 7 is a conceptual diagram illustrating transposing and broadcasting operations that may be used in the elementwise mode and the ternary mode of planar engine 340, according to an embodiment. A transpose operation and a broadcasting operation are examples of reshaping operations that may be performed by planar engine 340 on input data 342. FIG. 7 illustrates the reshaping operations to prepare for a binary elementwise operation that involves two source datasets, input data 710 and input data 720. Input data 710 and 720 may be stored in buffer 334 and then sent to planar engine 340 as input data 342.

Planar engine 340 may perform elementwise operations on data that are stored in buffer 334, whose data may exceed the capacity of planar engine 340 in an operating cycle. For example, although only three dimensions are shown in FIG. 7, buffer 334 may support the storage of tensors that have five or more dimensions. For ease of reference, the five dimensions may be referred to as group, depth, height, width, and channel. To enable fast computation and reduce the footprint of planar engine 340, planar engine 340 may support datasets of only certain dimensions. A work unit of planar engine 340 (representing the dataset of a size that can be processed by planar engine 340 in a single operating cycle) may be a planar dataset with height and width of a certain size (e.g., 5×5, 8×8, etc., depending on embodiments). An operating dimension of planar engine 340 is the dimension used in a work unit that is processed by planar engine 340. For example, in FIG. 7, the dimensions of width and height are the operating dimensions of planar engine 340.

The sizes of input data 710 and 720 are shown only for illustration purposes. Likewise, the names of the different dimensions of the input data, "width" (W), "height" (H), and "channel" (C) are provided for illustration purposes only. For the ease of reference, the dimensions of input data 342 (e.g., a tensor) discussed in FIG. 7 are illustrated as width, height, and channel. For example, a tensor with a size 3×3×1 means that the tensor has a width and height sizes of 3 and a channel size of 1. However, input data 710 and 720 can be of any suitable sizes and may or may not be of the same size. In various embodiments, one or more data may include more than three dimensions.

In one embodiment, planar engine 340 supports an elementwise operation of two input data that may represent tensors of different ranks and sizes. For example, input data 710 is a tensor of the size 5×5×5 while input data 720 is a tensor of the size 1×1×5, which may also be referred to as a channel vector. Planar engine 340, through a suitable component such as rasterizer 540, monitors the sizes and ranks of the input data used in the elementwise mode and performs transpose and broadcasting operations to match the sizes of two input data to allow the elementwise operation to be performed on each element of the input data 710.

Using a broadcasting operation, planar engine 340 enables elementwise operations to repeatedly apply the same computation to more than one values in the input data. By way of example, planar engine 340 may perform an elementwise operation by applying a first value to a first set of input data arranged in certain dimensions, applying a different second value to a second set of input data arranged across another dimension, and so forth. In FIG. 7, planar engine 340 performs an elementwise operation on input data 710 by applying the same value to the data on plane 712 that is arranged in the height and width dimensions. Planar engine 340, in turn, applies another value to the data on plane 714, which is at a channel different from plane 712. Planar engine 340 further applies yet a third value to the data on plane 716, and so forth. The different values applied to input data 710 are represented by another input data 720 as different drawing patterns in FIG. 7.

Since the rank and size of input data 710 and 720 are different, planar engine 340 may match the rank and the size of the smaller input data 720 to the larger input data 710 by first transposing the smaller input data 720 then duplicating the values of the smaller input data 720 across one or more dimensions of input data 720 in a broadcasting operation.

A transpose operation may be performed to improve the efficiency of the storage and hardware footprint of neural processor circuit 218. In one embodiment, buffer 334 may use memory that has a fixed granularity of access. For example, buffer 334 may use a granularity of 16 bytes for access (or another suitable fixed granularity). Thus, data are read or written to the buffer 334 at the multiples of the granularity. Using memory with a fixed granularity of access may allow the memory to be built more efficiently and cost effectively. Using this type of memory, data that are not the multiple of the granularity are less efficient to be accessed due to extra steps of alignment or merging that may be needed in getting the values in the data from buffer 334. To improve the efficiency of access of buffer 334 while allowing some flexibility to the data storage, addresses of tensors stored in buffer 334 may be expressed in alignment to the access granularity for some dimensions and be flexible and not restricted to the access granularity for one or more other dimensions. In some embodiments, tensors may be stored at an address that is linear flattening. For example, the address (Addr) of a particular tensor (g, z, y, x, c) may be stored at:

$$\text{Addr}(g,z,y,x,c)=\text{BaseAddr}+g*\text{GroupStride}+z*\text{DepthStride}+y*\text{RowStride}+x*\text{ColumnStride}+c*\text{ChannelStride} \qquad \text{Equation 1}$$

BaseAddr, GroupStride, DepthStride, RowStride and ChannelStride may be programmable values, but they may be aligned to the access granularity (e.g., multiples of 16 bytes). ColumnStride may be set by the hardware automatically based on the size of the tensor (e.g., one byte for INT8 data, or two bytes for FP16 data).

Since strides in other dimensions are multiples of the access granularity, the width dimension, in one embodiment, is rounded up to the granularity size by paddings (e.g., adding zeros to fill unoccupied memory locations). Put differently, some dimensions of data stored in buffer 334 may be rounded up to the access granularity while other dimensions might have more flexibility. In one embodiment, the width dimension is padded to next granularity multiple. As such, a channel vector 720, which has width equal to one, is inefficient to be stored because a padding of 14 or 15 bytes is needed. Instead of storing the vector 720 as a channel vector, in one embodiment, buffer 334 may store the vector 720 as a width vector 730.

When input data 710 is sent to planar engine 340, planar engine 340 may perform a transpose operation to turn width vector 730 to channel vector 720 (width-to-channel transpose) before an elementwise operation is performed. In an address of a tensor, by using programmable stride values GroupStride, DepthStride, RowStride and ChannelStride, planar engine 340 may perform the transpose operation with low or no cost (e.g., in terms of power, bandwidth, and time consumption). For example, the channel vector 720 has a value of Channel Stride=16 (or another suitable access granularity) and sizes of other dimensions equal to 1 (e.g., width=height=depth=groups=1). If the channel vector 720 needs to be transposed to a column vector, planar engine 334 may swap the values of RowStride and Channel Stride and swap the values of the size of height and the size of channels. As such, the resultant vector has a RowStride=16 and sizes of other dimensions equal to 1 (e.g., width=depth=groups=channels=1). A rasterizer, such as the rasterizer 540, may keep track of those values and the swapped values in various components of the planar engine 340 and buffer 334 to monitor various transpose operations.

For other vectors of different dimensions, other transpose operations of different dimensions can also be performed by swapping the stride values and dimension parameters. The transposed input data may be referred to as a version of the input data. The version of the input data may also include values that are converted to different formats at first format converter 502. In some embodiments, the version of input data may be the unadjusted and untransposed input data.

Depending on the size of input data 710, planar engine 340 may also perform a broadcasting operation to expand input data 720 to match the size of the larger input data 710. In one embodiment, planar engine 340 may perform a broadcasting operation on a version of input data 720 by at least duplicating a value of input data 720 across a first dimension. Planar engine 340 may also perform the broadcasting operation by further duplicating the value of input data 720 across one or more other dimensions. For example, in FIG. 7, planar engine 340 duplicate values of input data 720 in two dimensions (height and width) to generate a processed second input data 740, which is of the same rank as input data 710. The processed second input data 740 has a higher rank than input data 720, which is a vector. Planar engine 340 uses one or both of first filter 506 and second filter 514 to perform the elementwise operation to generate an output 750. Output 750 may be an unadjusted or an adjusted version of output 344 of planar engine 340. For example, in one case, second format converter 522 may perform one or more format conversion on the values of output 750 to generate the actual output 344. In another case, a transpose operation is carried out before the elementwise operation. At second format converter 522, a reversed transpose is performed to output 750. However, in some cases, a reversed transpose is not performed even though the input data is transposed.

The process of performing a transpose operation or a broadcasting operation by planar engine 340 may differ for data of different dimensions. For expansions of data in a dimension that is beyond the operating dimensions of planar engine 340 (e.g., channel, depth, group), planar engine 340 may perform the transpose or broadcasting operation by repeatedly fetching the same data value stored in buffer 334 in different operating cycles. This type of data expansion can occur when data are broadcasted across channels, depths, or groups or when a dataset such as a width vector is transposed to a channel vector.

For expansions of data in operating dimensions of planar engine 340, planar engine 340 may perform the broadcasting operation through demultiplexers 504 in the circuitry of planar engine 340 by using demultiplexers 504 to duplicate a value across one or more dimension. For example, first format converter 502 may include demultiplexers 504 used to broadcast values across width and height. Alternatively, or additionally, demultiplexers 504 may be located at first filter 506 and second filter 514. For example, planar engine 340 may expand data horizontally and perform elementwise operations horizontally at first filter 506. In turn, planar engine 340 may expand data vertically and perform elementwise operations vertically at second filter 514. In planar engine 340, the circuitry of demultiplexers 504 duplicates first value 732 in both width and height so that one value is expand to a 5×5×1 tensor 742 that has repeated values across the width and height dimensions. For example, a demultiplexer 504 may have a single input line and multiple output lines to generate copies of the input. A demultiplexer 504 may be used for expansion of each dimension.

An elementwise operation on data may be performed by planar engine 340 in more than one operating cycle due to the size of the input data exceeding a work unit. For example, in a first operating cycle, planar engine 340 only fetches first value 732 of width vector 730. Tensor 742 is used in an elementwise operation to combine with values in the first channel of input data 710 (stored as first plane 712) in the first operating cycle. In the second operating cycle, planar engine 340 only fetches second value 734. In planar engine 340, second value 734 is expanded in both width and height dimensions to generate another 5×5×1 tensor 744 for use in another elementwise operation that combines tensor 744 with the second channel of input data 710 (stored as the second plane 714) in the second operating cycle. The process is repeated for the third, fourth, and fifth operating cycles to complete the elementwise operation on the input data 710. To complete operations on a source dataset that have three or more dimensions (e.g., 5 dimensions), planar engine 340 may go through the work units (e.g., 5×5 work units) within a channel one work unit at a time, move to another channel until other channels are completed, and loop to another dimension (e.g., depth) until processing across other dimensions are also completed. Planar engine 340 processes a work unit of 5×5 width and height of a single channel in an operating cycle. To complete the elementwise operation of input data 710, which has 5 channels, 5 operating cycles are used.

In another example that is not illustrated in FIG. 7, the second source dataset is a scalar that may need to be expanded in width, height, and channel. The expansions of data in width and height are performed in a manner shown in FIG. 7 that is the same as how first value 732 is broadcasted to generate tensor 742. For the expansion of data in channel, planar engine 340 may achieve the broadcasting operation by repeatedly fetching the same value in different operating cycles. Hence, planar engine 340 may use fetching to duplicate a first value across a first dimension and use demultiplexers 504 to duplicate a second value across a second dimension and a third dimension. The use of broadcasting operation reduces the footprint and storage of buffer 334 because datasets are not expanded until reaching planar engine 340.

Transpose and broadcasting may be selectively performed based on the sizes of the input data of planar engine 340. While in FIG. 7 both a transpose operation and a broadcasting operation are performed, in various cases, planar engine 340 may only perform one or none of the two operations on either input data 710 or 720 or on both input data 710 and 720. For example, in some cases, only broadcasting operation is performed on the input data but not the transpose operation. In other cases, both input data for the planar engine 340 may be transposed and broadcasted before an elementwise operation is performed. For example, in one case, the elementwise operation is between a width vector and a channel vector. Broadcasting operations are performed on both vectors to expand each vector to two or more dimensions and to match the size of each other. In another example, planar engine 340 may perform scaling and biasing of values in input data within an operating cycle in a ternary mode, the scaling factor(s), which may be a scalar or a vector, may be broadcasted as a two-dimensional matrix with width and height. The two-dimensional matrix may be saved in a first channel of a second tensor. Likewise, the bias value(s), which may also be a scalar or a vector, may be broadcasted as another two-dimensional matrix. This two-dimensional matrix may be saved in a second channel of the second tensor. In yet another example, both input data 710 and 720 may be of the same size and rank, neither the transpose nor the broadcasting operation is performed in planar engine 340 before the elementwise operation is performed.

The fetching and multiplexing may also be used for other suitable re-sizing operations. For example, data may be stored in buffer 334 as a 3-dimensional tensor (W, H, C), values in height and channels may be folded into a single dimension by appropriate fetching of data so that the input data of planar circuit 340 is a 2-dimensional tensor (W, H×C). Values in the width dimension may be processed in planar circuit 340 and the values in the output may be reshaped back to 3 dimensions.

While, in illustrating the reshaping operations such as broadcasting operation, duplication of values across one or more dimensions is discussed. In some embodiments, the broadcasting operations may include expanding the size of input data using operations other than duplicating a value. For example, the expanded values across a dimension may be derived from the initial value in the input data, but the derivation may not need to be duplications.

Example Process in Operating a Neural Processor

Figure 8:
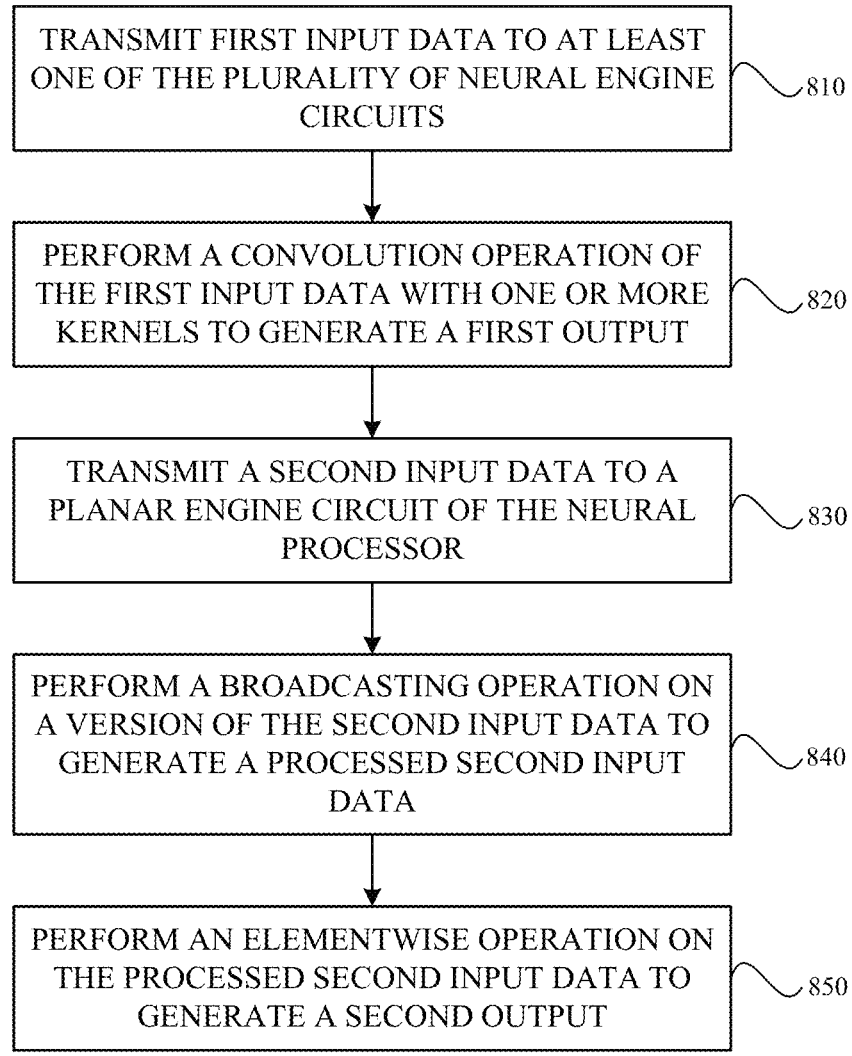
FIG. 8 is a flowchart illustrating a method of operating a neural processor, according to one embodiment.

FIG. 8 is a flowchart depicting an example process of operating neural processor circuit 218, in accordance with an embodiment. Data processor circuit 318 transmits 810 first input data to at least one of neural engine circuits 314. The first input data may include values in a plurality of channels. The first input data may be an input of neural processor circuit 218 that originated from a machine learning model instantiated and stored in system memory 230. The first input data may also be the output of neural engines 314 or planar engine 340 in previous operating cycles.

A convolution operation is performed 820 on the first input data at one or more neural engine circuits 314 using one or more kernels to generate a first output. In some cases, the same first input data may be transmitted to more than one neural engine circuits 314. In other cases, each neural engine circuit 314 receives a different first input data. The kernels may be the same or different for various neural engine circuits 314.

Second input data is transmitted 830 to planar engine circuit 340 from data processor circuit 318. Planar engine circuit 340 may be coupled to neural engine circuits 314. The second input data may correspond to the first output generated by one or more neural engine circuits 314. The second input data may also correspond to a version of the first input data of neural processor circuit 218. For example, a version of the first input data of neural processor circuit 218 may be unadjusted data stored in buffer 334 or the data that is converted to another format.

Planar engine circuit 340 performs 840 a broadcasting operation on a version of the second input data to generate a processed second input data by at least duplicating a first value of the second input data across a first dimension. Planar engine circuit 340 may also duplicate, in the broadcasting operation, the value across a second dimension. Using FIG. 7 as an example, the second input data may correspond to input data 720 and the processed second input data may correspond to processed second input data 740.

Planar engine circuit 340 performs 850 an elementwise operation on the processed second input data to generate a second output. Planar engine circuit 340 may support unary, binary, and ternary elementwise operations. In a unary elementwise operation, planar engine circuit 340 may perform the elementwise operation on the processed second input data itself such as performing elementwise square (e.g., multiplying each value by itself). In a binary elementwise operation, third input data may be transmitted to planar engine circuit 340. By way of example, the second input data may correspond to input data 710 in FIG. 7. The broadcasting operation may bring the processed second input data to the same size and rank as the third input data. Elementwise operation may be performed to combine the third input data and the processed second input data to generate the second output. Example elementwise operation may include elementwise addition, elementwise comparison (e.g., comparing which corresponding values in the second input data and the third input data are larger or smaller), and elementwise multiplication. In a ternary operation, the second input data may be combined with third input data and fourth input data. The third input data and the fourth input data may be fetched and reshaped as a single tensor before an elementwise operation is performed.

The example process shown in FIG. 8 is merely an example process of operating neural processor circuit 218. Other processes such as pooling mode and reduction mode may be performed by planar engine circuit 340 and convolution operations and matrix multiplication may be performed by neural engine circuits 314. The engines in neural processor circuit 218 may operate in any orders. For example, in another process, a dataset may be processed by planar engine circuit 340 first before being processed by a neural engine circuit 314. In yet another process, the dataset may be repeatedly processed by the same type of engines.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor, comprising:
a plurality of neural engine circuits, at least one of the neural engine circuits configured to perform a convolution operation of first input data with one or more kernels to generate a first output; and
a planar engine circuit coupled to the plurality of neural engine circuits, the planar engine circuit comprises one or more demultiplexer circuits, the planar engine circuit configured to:
receive second input data corresponding to the first output or a version of the first input data of the neural processor,
perform a broadcasting operation on a version of the second input data to generate a processed second input data by at least duplicating a first value of the second input data across a first dimension, the broadcasting operation comprises using the one or more demultiplexer circuits to duplicate the first value across the first dimension, and
perform an elementwise operation on the processed second input data to generate a second output.

2. The neural processor of claim 1, wherein the broadcasting operation is further performed by duplicating the value of the second input data across a second dimension.

3. The neural processor of claim 1, wherein the version of the second input data is a transposed version of the second input data.

4. The neural processor of claim 3, wherein the planar engine circuit is further configured to:
perform a reversed transpose to the second output.

5. The neural processor of claim 1, wherein the second input data is a vector and the processed second input data has a higher rank than the vector.

6. The neural processor of claim 1, wherein the planar engine circuit is further configured to:
receive a third input data, and the processed second input data having a ranking that is the same as the third input data, wherein the elementwise operation is performed to combine the third input data and the processed second input data to generate the second output.

7. The neural processor of claim 1, wherein the elementwise operation includes one or more tensor addition, elementwise maximum, elementwise minimum, or elementwise multiplication.

8. The neural processor of claim 1, further comprising a buffer coupled to the plurality of neural engine circuits and the planar engine circuit, the buffer configured to store the second input data, wherein the planar engine circuit is configured to perform the broadcasting operation by repeatedly fetching the first value from the buffer.

9. The neural processor of claim 8, wherein the planar engine circuit comprises one or more demultiplexer circuits, wherein the planar engine circuit is configured to perform the broadcasting operation further by using the one or more demultiplexer circuits to duplicate a second value across a second dimension different form the first dimension.

10. The neural processor of claim 1, wherein the planar engine circuit comprises a format converter configured to perform one or more format conversions on the second input data to generate the version of the second input data.

11. A method for operating a neural processor, the method comprising:
transmitting first input data to at least one of a plurality of neural engine circuits of the neural processor;
performing, using the at least one of the plurality of neural engine circuits, a convolution operation of the first input data with one or more kernels to generate a first output;
transmitting second input data to a planar engine circuit of the neural processor, the planar engine circuit coupled to the plurality of neural engine circuits, wherein the neural processor further comprises a buffer coupled to the plurality of neural engine circuits and the planar engine circuit, the buffer storing the second input data, the second input data corresponding to the first output or a version of the first input data of the neural processor;
performing a broadcasting operation on a version of the second input data to generate a processed second input data by at least duplicating a first value of the second input data across a first dimension, the broadcasting operation comprises repeatedly fetching the first value from the buffer; and performing an elementwise operation on the processed second input data to generate a second output.

12. The method of claim 11, further comprising:
duplicating, in the broadcasting operation, the value of the second input data across a second dimension.

13. The method of claim 11, wherein the version of the second input data is a transposed version of the second input data.

14. The method of claim 11, wherein the second input data is a vector and the processed second input data has a higher rank than the vector.

15. The method of claim 11, further comprising:
transmitting third input data to the planar engine circuit, and the processed second input data having a ranking that is the same as the third input data, wherein the elementwise operation is performed to combine the third input data and the processed second input data to generate the second output.

16. The method of claim 11, wherein the planar engine circuit comprises one or more demultiplexer circuits, wherein performing the broadcasting operation comprises using the one or more demultiplexer circuits to duplicate the first value across the first dimension.

17. A neural processor, comprising:
a plurality of neural engine circuits, at least one of the neural engine circuits configured to perform a convolution operation of first input data with one or more kernels to generate a first output; and a planar engine circuit coupled to the plurality of neural engine circuits, the planar engine circuit comprises one or more demultiplexer circuits, the planar engine circuit configured to:
receive second input data corresponding to the first output or a version of the first input data of the neural processor,
perform a broadcasting operation on a version of the second input data to generate a processed second input data by at least duplicating a first value of the second input data across a first dimension, the broadcasting operation comprises using the one or more demultiplexer circuits to duplicate the first value across the first dimension, and
perform an elementwise operation on the processed second input data to generate a second output; and
a buffer coupled to the plurality of neural engine circuits and the planar engine circuit, the buffer configured to store the second input data, wherein the planar engine circuit is configured to perform the broadcasting operation by repeatedly fetching the first value from the buffer.

18. The neural processor of claim 17, wherein the version of the second input data is a transposed version of the second input data.

19. The neural processor of claim 18, wherein the planar engine circuit is further configured to:
perform a reversed transpose to the second output.

20. The neural processor of claim 17, wherein the second input data is a vector and the processed second input data has a higher rank than the vector.

* * * * *